United States Patent [19]

Parra

[11] Patent Number: 5,099,455
[45] Date of Patent: Mar. 24, 1992

[54] PASSIVE ACOUSTIC AQUATIC ANIMAL FINDER APPARATUS AND METHOD

[76] Inventor: Jorge M. Parra, 7332 Grand Blvd., New Port Richey, Fla. 34652

[21] Appl. No.: 545,954

[22] Filed: Jul. 2, 1990

[51] Int. Cl.$^5$ .............................................. G01S 3/80
[52] U.S. Cl. ..................................... 367/120; 367/127
[58] Field of Search ................ 367/118, 120, 127, 136

[56] References Cited

U.S. PATENT DOCUMENTS

| | | | |
|---|---|---|---|
| 1,383,690 | 7/1921 | Arnold | 367/130 |
| 1,584,613 | 5/1926 | Comstock et al. | 367/130 |
| 3,189,870 | 6/1965 | Roever | 367/20 |
| 3,239,803 | 3/1966 | Goobey | 367/154 |
| 3,319,734 | 5/1967 | Pavey, Jr. | 367/154 |
| 3,382,598 | 5/1968 | Wilson | 367/112 |
| 3,434,104 | 3/1969 | Stapleton et al. | 367/154 |
| 3,613,071 | 10/1971 | Quay | 367/20 |
| 3,757,286 | 9/1973 | Richard | 367/106 |
| 3,797,459 | 3/1974 | Harris | 119/5 |
| 3,893,063 | 7/1975 | Park et al. | 367/130 |
| 4,084,150 | 4/1978 | Massa | 367/154 |
| 4,122,432 | 10/1978 | Triebold et al. | 367/135 |
| 4,173,008 | 10/1979 | Keith et al. | 367/124 |
| 4,509,151 | 4/1985 | Anderson | 367/130 |

OTHER PUBLICATIONS

Knudsen et al., Journal of Marine Research, vol. 7, No. 3, 1948, pp. 410–429.
Principles of Underwater Sound, Third Edition, J. Ulrick, pp. 217–219.
Abyss—The Deep Sea and the Creatures That Live in It, Rev. Ed. 1971, C. P. Idyll, pp. 173, 264–267.

*Primary Examiner*—Daniel T. Pihulic
*Attorney, Agent, or Firm*—Jim Zegeer

[57] ABSTRACT

Aquatic animal finder apparatus and method include one or more passive transducers for converting sounds, including bio-soundwaves from a living aquatic animal source traveling in a body of water, to electrical signals, the transducer is caused to scan about a selected axis, the electrical signals are filtered to eliminate all man-made signals of a periodic character and pass bio-sound electrical signals. A discriminator is connected to the filter and programmed to pass a predetermined pattern of the bio-soundwave electrical signals constituting a sonic profile, signature or imprint of a selected aquatic animal. The direction of a selected aquatic animal is detected and presented to the user and range, depth and direction of movement of the selected aquatic animal are determined solely from the biosound signals received from the aquatic animal.

34 Claims, 5 Drawing Sheets

DR = DEPTH OF RTA
PS = DIRECT PATH SIGNAL
BS = BOTTOM SURFACE SIGNAL
B = BOTTOM SIGNAL
SB = SURFACE BOTTOM SIGNAL

RANGE = TIME DIFFERENCE OF $(T_B - T_{BS}) \times 4800 \, FT/SEC$

DEPTH = TIME DIFFERENCE OF $(T_B - T_{SB}) \times 4800 \, FT/SEC$

PASSIVE ACOUSTIC AQUATIC ANIMAL FINDER APPARATUS AND METHOD

BACKGROUND AND BRIEF DESCRIPTION OF THE INVENTION

It has been recognized from ancient times that fishes and other aquatic animals living in the sea and water produce noises and in some areas fishermen have located certain species of fish by listening for their characteristic sounds. Most detail of information on the production of sound by fishes has been gathered in the past few decades as the importance of underwater sound to naval operations and fisheries has become apparent. See Knudsen et al. Journal of Marine Research, Vol. 7, No. 43, 1948, pgs. 419–429 which is incorporated herein by reference. Also, the instrumentation necessary for research on sound has become more available in recent years.

Water is a good medium for the transmission of sound. Sounds can be carried long distances in water, being reflected off the bottom, the surface and density layers caused by temperature or salinity differences.

Most sounds made "on purpose" by fishes are the results of stridulation or the vibration of the gas bladder. Of course, the gas bladder can be involved in other ways, and may be brought into play to amplify or otherwise modify the stridulatory sounds. Grinding, snapping, or rubbing teeth together is the most common type of stridulation among fishes. Most gas bladder sounds arrive because of vibrations set up by some special means. Stridulation can be enhanced by the resonance of the gas bladder, but many noise makers are equipped with muscles that vibrate the gas bladder directly or indirectly.

Noises made by fishes have been described by a great variety of terms. Sounds of schools of fish swimming have been called rustles or roars. Stridulation produces sounds reminiscent of clicks, rasps, scratches, etc. when not aided by the gas bladder, and croaks, grunts, and knocks when the gas bladder acts as a resonator. Stridulatory sounds can range from 100 to 8000 hertz (Hz) although the gas bladder aided sounds are generally well below 1000 Hz and the unaided stridulations produce frequency usually in the 1000–4000 Hz range.

Sounds made by vibration of the gas bladder have been described as hoots, boops, grunts, yelps, and croaks. Gas bladder sounds are harmonic and usually of low frequency from 40 to 250 CPS with a great majority in the 75 to 100 Hz range.

Method and apparatus for locating and classifying and identifying underwater marine animals by means of the sounds they make are disclosed in Anderson U.S. Pat. No. 4,509,151 which is incorporated herein by reference. In Anderson, an elongated submersible array is adapted to be towed 300–400 feet behind a ship in various directions and at depths from 78–169 feet, depending on speed. The array is made up of subarrays of multiple hydrophones which are arranged along the length of each subarray in groups. By changing the combination of groups, the frequency response and directional sensitivity of the array is varied and the outputs are selectively analyzed both visually and audibly for characteristic fish sounds. There are many drawbacks to systems of the type disclosed in this Anderson patent. In order to give orientation to the fish, Anderson must move to work and requires a length which is at least a substantial fraction of the first acoustic wavelength and must be towed at a predetermined depth below the water surface with different sets of hydrophones being connected to different sets of filters in a very complex system. It requires a longitudinally elastic vibration isolation module which is coupled to the forward end of the acoustic array and this vibratory module has a predetermined buoyancy at a predetermined depth in the water, and rope drogue to put tension on the entire assembly.

THE PRESENT INVENTION

The object of the present invention is to provide an improved low-cost passive acoustic aquatic animal detector and method which provides an indication of the presence of the aquatic animal, the direction or orientation thereof relative to the transducer, and range, as well as a an indication of the type fish that is present. The operation of the passive acoustic aquatic animal detector according to this invention is that the acoustic sounds are received by the transducer and the acoustic energy is converted to electrical energy which is then amplified and fed into a filter and discriminator section where the signal is bandpass filtered to remove unwanted background noise and interference now made noise and pass the desired bio-sound signals. The configuration of filters are in a cascaded high-pass/low-pass configuration to maximize attenuation outside the desired frequency. In a preferred embodiment, two or more bandpass filters are used, the output of two bands, one in the 25 to 250 Hz range and the other in the 250 to 1 kHz range. For marine mammals, the pass band is 1000 Hz to 5000 Hz. The signal is then passed through a pair of solid-state discriminators, each of which includes, in a preferred embodiment, a phase locked loop which is adjustable or programmed to pass a predetermined discrete pattern of electrical signals constituting a sonic profile, signature or imprint of a selected aquatic animal.

When a single transducer is used, it is rotatable or orientable about an axis and by noting when the maximum amplitude signal is received, and the orientation of the transducer, the direction to the particular fish is indicated.

In a further embodiment, a plurality of transducers are spacedly mounted in a generally circular array about an axis and the transducers are each energized and connected to a preamplifier which has outputs connected to a series of analog gates, the analog gates being selectively activated so as to pass, in any sequence desired, any signals received by the transducers. The circuitry initially operates as a multiplexer with respect to each of the segments of the transducers and in effect, a scanning action can be obtained through any quadrant, group of quadrants or all of the quadrants and this can be controlled by a microprocessor. The multiplexed signals are amplified, applied to one or more bandpass filters and discriminators for indicating the presence of the fish and for driving a display driver for indicating the distance to the fish as well as the direction. In this embodiment, the multiplexed signal is digitized in an analog-to-digital converter circuit supplied to a microprocessor which controls a voltage control oscillator and a counter circuit so that the maximum signal received by any one or two (or more) transducer segments can be utilized to indicate a precise direction to the a particular aquatic animal. The filter and discriminator functions as well as the range determining function can be performed by a microprocessor. In this case, a library of aquatic animal sounds, signature or imprints for different fish and mammal species can be stored in a read-only memory, accessed by the microprocessor to determine the particular type fish sounds and mammal being received. The particular fish and/or mammal and direction thereof can be stored in a local memory (RAM) and presented to the user on a display (typically a small low cost dot matrix display liquid crystal display (LCD) or electroluminescent (EL)) indicating the type fish or aquatic animal in each direction, the range thereof and thus permit the fisherman to select which particular fish species of fish to go after and fish or mammals to avoid.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
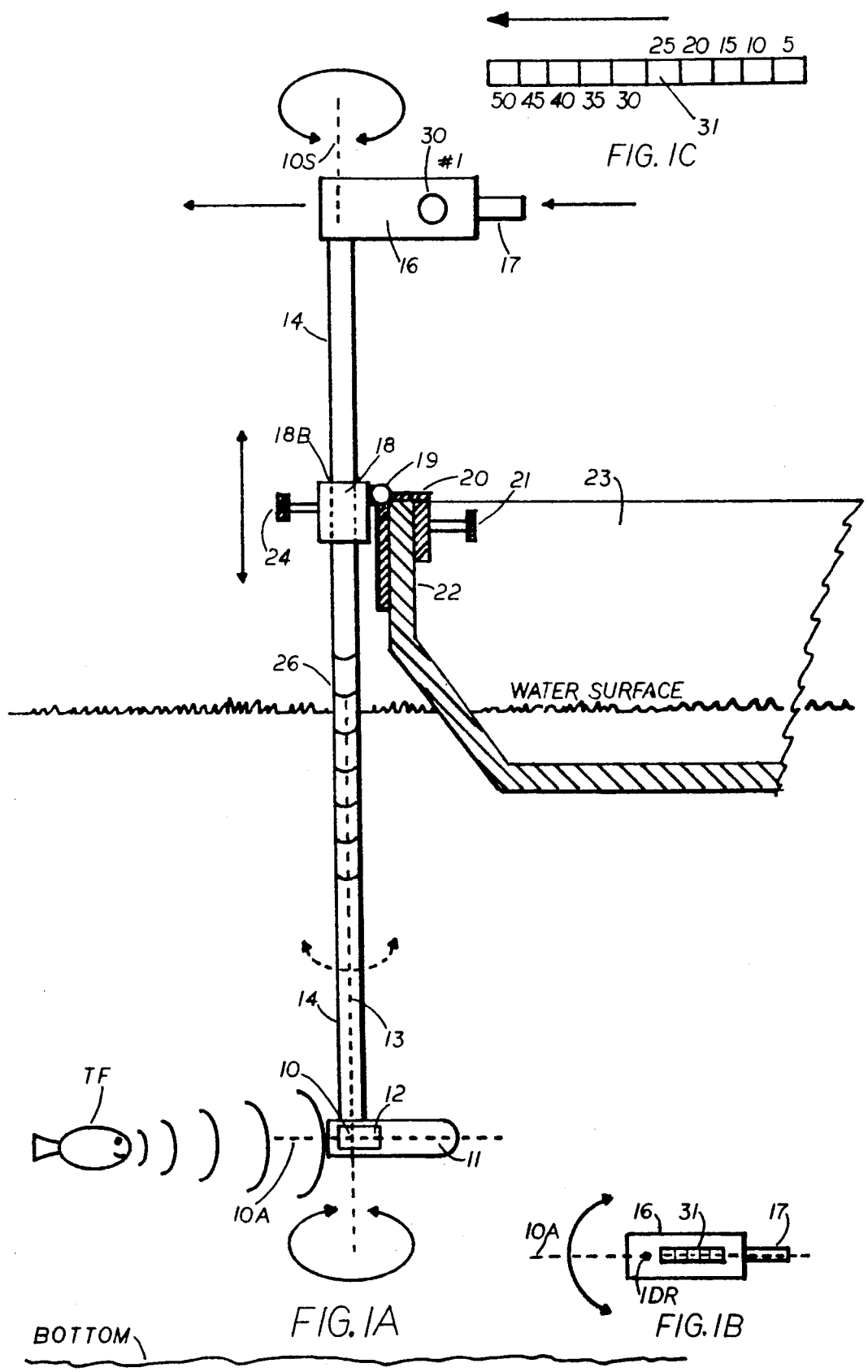
FIG. 1a is a diagrammatic illustration of a simplified embodiment of the invention.
FIG. 1b is a top plan view of the main instrument housing shown in FIG. 1.
FIG. 1c is an enlarged plan view of the bar indicator showing range indications.

Referring now to FIGS. 1a and 1b, a acoustic transducer 10 which is a marine-type microphone or a hydrophone is mounted in a housing 11 which also contains a preamplifier 12 and an amplified signal is carried through coax cable 13 which passes through hollow control shaft 14 to a housing 16 which has a control handle 17 thereon. Transducer 10 has an aiming axis 10A and a scanning or rotation axis 10S. A mounting bracket 18 is pivotally secured by a pivot 19 to a transom bracket 20 which has a locking set screw or clamp 21 which secures the bracket to the transom or gunwale of a boat 23. Bracket 18 has a bearing 18B therein to rotatably support control post 14. Control post 14 is slidable in bearing 18b and a clamp screw 24 clamps it in an adjusted depth position in the water. The different depths of the transducer 10 in the water is indicated by indicia 26 on control post 14. The bracket 18 allows 0-360 degree swiveling or rotation of post 14 therein about scanning axis 10S very much in the manner of conventional outboard electric motors. Thus, the transducer 10 and control box 16 are rotatable through 0-360 degree so that when the transducer 10 is positioned below the bottom of the boat 23, it can search in all directions of the compass and in this manual search mode, two indicia are provided to the user, namely, an audible sound from a piezo-sounder 30 and a display on a bar graph-type display 31 (FIG. 1b). The scan axis need not be vertical. Transducer 10 can be tilted about the axis of pivot 19 and clamped in that position so that the axis 10A of transducer 10 is aimed slightly downward or upward. Although not shown, transducer 10 can be pivotally mounted on a universal joint at the lower end of control post 14 and its annular relationship to control post 14 separately adjusted.

As will be described more fully hereinafter, when a selected fish sound is detected, a piezo-sounder is electrically energized (preferably after a set threshold or squelch level) to indicate the presence of a fish F in a direction in which the transducer axis 10A is oriented or pointing. By orienting the transducer 10 until the sound is the loudest, the transducer is pointed precisely in the direction of the fish and, as shown in FIG. 1b, a bar graph indicator 31 indicates the strength or amplitude which is a measure of the range to the fish. Thus, as shown in the enlarged scale of FIG. 1c the bar graph display device is conventional, the number of bars 31b which are illuminated or lit is an indication of the amplitude.

Note that the long dimension of the indicator 31 is parallel to the sensing axis 10A of transducer 10 so that the user will view the display 31 as scanning, and may also listen to the piezo-sound 30 so that when the maximum amplitude of sound is heard in the piezo-sounder 30 and/or the maximum amplitude is displayed on the bar graph display 31 the user knows that that is the direction to cast in and/or move the boat in that direction. As indicated in FIG. 1c, the multiple bars 31B may be graduated in terms of feet to the target so that the first bar may be 1 to 10 feet, the second bar 10 to 15 feet, the third bar 15 to 20 feet, the fourth bar 20 to 25 feet and so on. By slowly scanning the transducer 10 by the rotation of handle 17 about the axis of post 14, the sound will peak when the transducer is pointed directly at the fish and the maximum number of bars of the graph will be illuminated or lit providing an indication of the range to the target fish. It will be appreciated that various ways of causing the light to "flash" or go on and off in a sequence may be incorporated in the invention. For example, a peak amplitude detector may be incorporated to cause the light bars to illuminate only within a predetermined number of scan degrees to each side of the maximum amplitude.

Figure 2:
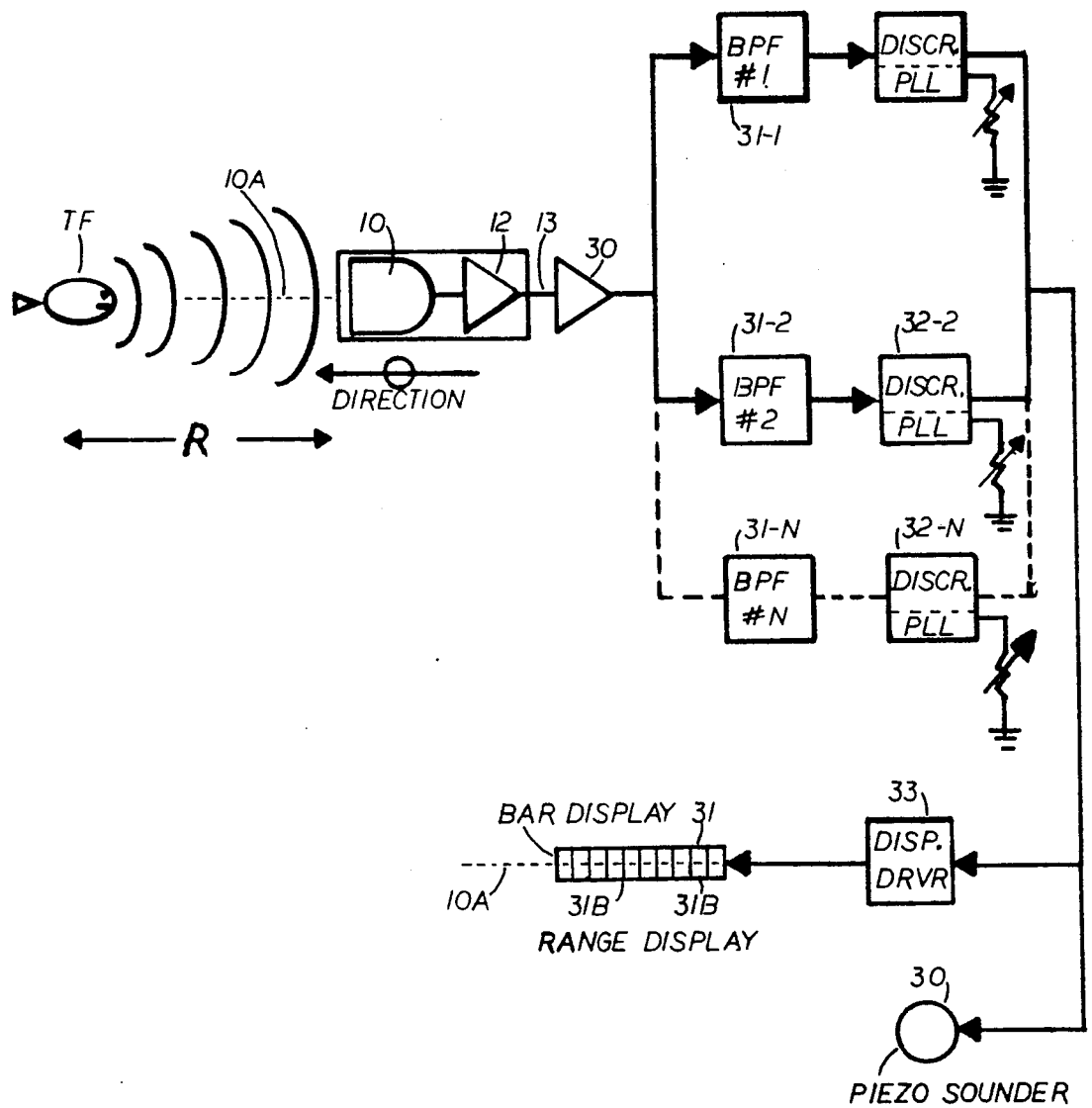
FIG. 2 is a schematic block diagram of the passive acoustic fisher finder or detector shown in FIG. 1.

Referring now to FIG. 2, transducer assembly 10 and preamplifier 12 are connected by a coaxial cable 13 to a further amplifier 30 which, in turn, provides amplified biosound signals as well as all other signals such as boats and the like to bandpass filters 31-1, 31-2 . . . 31-N. Filters 31 are connected to receive the electrical signals from the transducer 10 and eliminate therefrom all manmade and similar signals of a periodic character and to pass the biosound electrical signals from, for example, the target aquatic animal or fish TF. For example, one band pass filter can be set to have a pass band of 25-250 Hz and the other a pass band of 250-1 kHz and another pass band of 1-2 kHz, obviously the pass band frequencies can vary and be adjusted to pass wider or narrower bands and reject or provide a high impedance to frequencies outside the selected bands. Discriminators 32-1, 32-2, 32-N are connected to receive the outputs of bandpass filters 31-1, 31-2 . . . 31-N, respectively, and each probe discriminator includes a phase lock loop PLL which is programmed to pass a predetermined pattern of biosound wave electrical signals constitute a sonic profile imprints or signature of a selected fish. That is, the discriminator is programmed by adjustment resistors 32R-1 . . . 32R-N to detect a desired pattern of bio-sounds. For example, the discriminators can be programmed to detect sounds correlated to a general family of aquatic animals such as bass, trout, snapper, grouper, dolphin, porpoises, whales (mammals) or shrimp, crabs, sea urchin, octopus, etc., each species of which has its own unique and discrete biosound signature or imprint. In one embodiment they were set as follows:
Frequency band for BPF31-1: 25-250 Hz
Frequency band for BPF31-2: 250-2500 Hz Frequency for most marine mammals for BPFN 1000-5000 Hz Obviously the pass band filters can be set quite differently than the above.

The output of the band pass filter (BPF) can be connected to a level-detector (not shown) and a piezo-sounder which will provide an aural or visual indication of bio-sounds above an ambient level. This will detect primarily periodic bio-sounds. The discriminators will detect both periodic and non-periodic bio-sounds. The band pass filters reduce the bands for the discriminators. This provides rejection of entire bands which may be of no interest at a given time. Each discriminator, in the preferred embodiment, use a phase lock loop (PLL) which will lock onto a precise frequency. More than one discriminator can be used if multiple frequencies are of interest at the same time. When such a frequency is detected by the PLL circuit, an indication signal thereof is provided to drive a visual or aural indicator directly or to a microprocessor. The lock-on time appreciably less than one (1) second at low frequencies and less than one-thousands of a second (1 ms) at higher frequencies. This fast lock-on time is preferable as some bio-sounds which it is desired to detect are of a periodic nature. The width of the pass band of the discriminator (e.g. range of frequencies that the discriminator will detect) is adjustable up to a given percent of the center frequency, if the percent is 14% (i.e., $0.14 \times 500$-70 Hz pass band of 465-535 Hz). A plurality of discriminators can be used where reduction in the total range they are programmed to reduce the detections time.

The microprocessor uses digital signal processing (DSP) which provides the most accuracy in determining more precisely the family of fishes involved, or aquatic animal, producing the bio-sound and the microprocessor control the various functions outputted to the operator.

Bio-sounds signals are supplied to piezo sounder 30 which converts the electrical biosound signals passed by bandpass filters 31 and discriminators 32 to an audible sound at an intensity corresponding in amplitude to the strength of the signal received by the transducer 10 and, accordingly, the amplitude corresponding generally to the range R to target fish TF.

In addition, these signals are supplied to display driver 33 for driving LED bar display 31. The number of bar elements 31B which are illuminated or lit corresponding to the strength of the acoustic signal and accordingly correspond to range R. An adjustable level detector may be incorporated in the piezo-sounder or the display, or be provided at the outputs of the discriminators so as to provide a minimum or squelch level before there is any activation of those devices.

Figure 3:
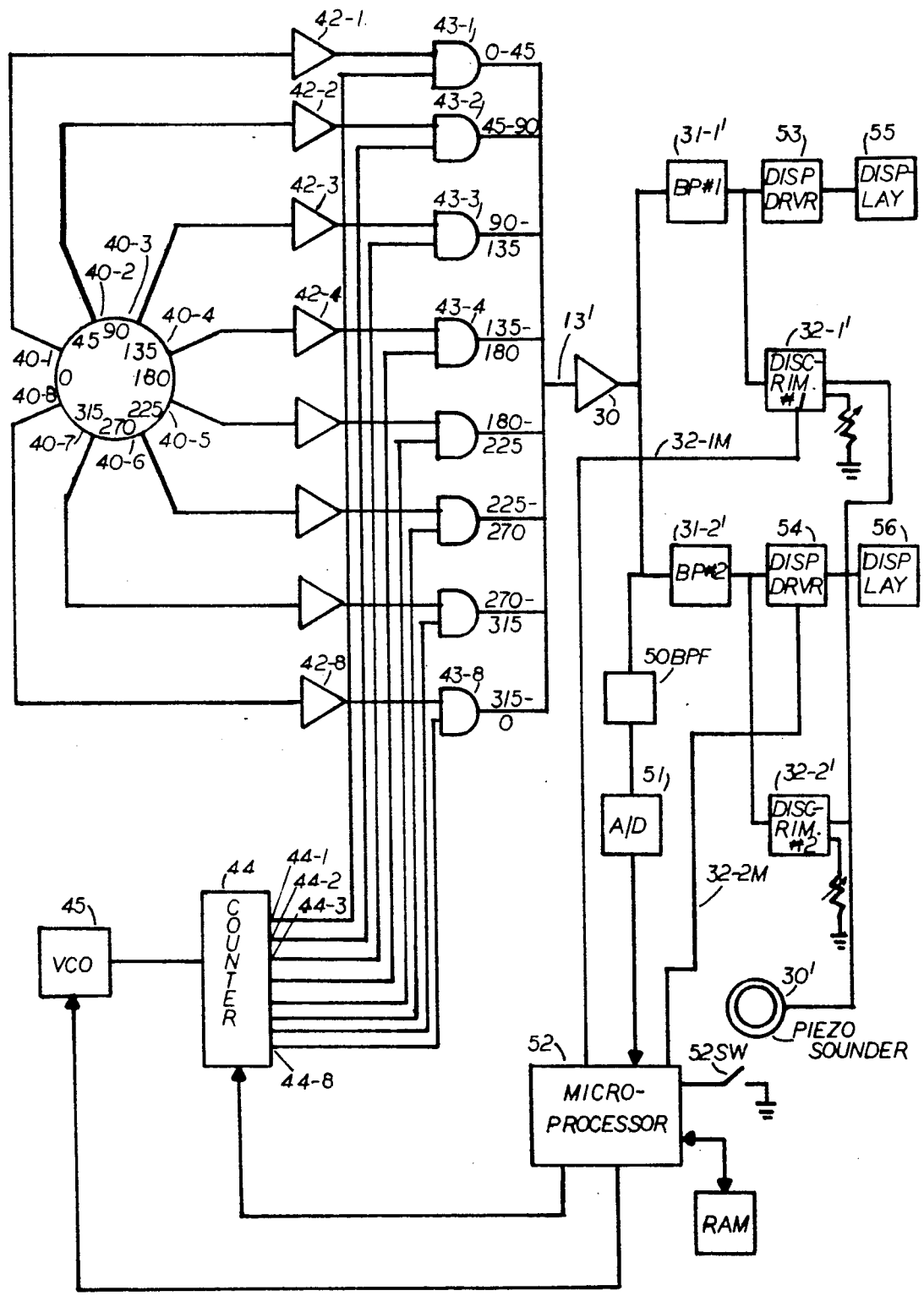
FIG. 3 is a schematic block diagram of a further embodiment of the invention.

Instead of scanning for target aquatic animals TF by mechanical rotation of transducer 10, FIG. 3 illustrates an electrical scanning wherein there are two transducers per quadrant making a total of eight transducers, there can be, of course, be more or less transducers as desired. Each transducer 40-1, 40-2, 40-3 . . . 40-8 is connected to a preamplifier 42-1, 42-2, 42-3 . . . 42-8, respectively, whose outputs are supplied to a gate circuit 43-1, 43-2 . . . 43-8, respectively, which receive as a second input enable or gate signals from a counter 44 which, in turn, receives inputs from control oscillator 45. The arrangement is such that the oscillator 45 supplies pulses to counter 44 which counts these pulses to produce outputs on terminals 44-1, 44-2, 44-3 . . . 44-8, one for each gate circuit 43-1 so that these pulses in effect sample the signals picked up by each of the transducers 40-1, 40-2, 40-3 . . . 40-8. They thus appear on the outputs of gates 3-1, 43-2 . . . 43-8 as the acoustic signals detected for the eight quadrant segments 0 to 45 degrees, 45 to 90 degrees, 90 to 135 degrees, 135 to 180 degrees, 180 to 225 degrees, 225 to 270 degrees, 270 to 315 degrees and 315 to 0 degrees. The time period for sampling e.g., the rate of the VCO operation 45 and the counter operation 44 can be adjusted, either speeded up or slowed down. A speed of 1 rpm, for example, results in each segment sampling of about 7.5 seconds. Each of the signals issuing from the gate circuits 43-1, 43-2 . . . 43-8 e.g., the multiplexed signals, are supplied by coaxial cable 13' to amplifier 50 and each of the signals is supplied to bandpass filter 31-1' and 31-2', discriminators 32-1' and 32-2' and then to a piezo-sounder 30'.

The multiplexed signals from amplifier 50 are bandpass filtered in filter 50BPF and are supplied to analog-to-digital converter 51 which supplies these signals to microprocessor 52 which serves as a controller for counter 44 and voltage controlled oscillator 45. Bandpass filter 50 is similar to filter 31 in that it eliminates all periodic signals and passes only biosound signals. Microprocessor or controller 52 detects the maximum amplitude in each segment of transducer 40-1, 40-2, 40-3 . . . 40-8 and stores same in memory 52 and causes counter 44 to terminate the scan to temporarily lock on those segments in which the maximum amplitude is being produced. For example, if the maximum amplitude of incoming biosound signals is between segments 40-3 and 40-4, indicating that there is aquatic animal activity in the area between 90 and 180 degrees (these angular directions are relative of course), the microprocessor 52 will cause counter 44 to lock on and provide gate signals to gates 43-3 and 43-4. If the detected signals do not appear to be of interest, the processor 52 can be instructed to resume the scanning operation by signal switch 52SW.

It will be appreciated that as described in connection with FIG. 4, microprocessor 52 can be programmed to perform the functions of bandpass filters 31-1' and 31-2' as well as the functions of discriminators 32-1' and 32-2'.

The bandpass filtered signals from bandpass filters 31-1' and 31-2' are supplied to display drivers 53 and 54, respectively, which, in turn, drive displays 55 and 56, respectively. These displays can be the bar displays discussed earlier herein or can be LCD-type displays in which the angular orientation of the particular segment which is receiving a biosound signal is being displayed.

Referring again to the counter 44, the gate pulses therefrom to the gates 43-1, 43-2, 43-3 . . . 43-8 in effect cause a scanning of the sensor segments or transducer segments 40-1, 40-2, 40-3 . . . 40-8 and, in a preferred embodiment, the scan rate is at about 1 rpm. At this rate the gates will pass the transduced electric signals from the transducers 40 about every 7½ seconds during the scan mode and then between one, two or three adjacent segments according to the output of the microprocessor 52. Thus, should the fish be in a location between bridging two transducer segments, and then moves to where it is basically centered on one segment, the microprocessor tracks this movement and provides an indication on the display of the movement of the fish and the direction of the movement of the fish. For example, if the fish is swimming in a circle around the transducer, the output of the different transducers will detect the acoustic sounds transmitted by the fish as it swims activating each transducer in turn and providing a visual display of the swimming movement.

The kinds of fish are detected by the discriminators which, as indicated above, each are programmed in this embodiment to detect sounds unique of a selected species of fish. A solid-state discriminator unit which has been found useful for this is designated as LM567 by National Semiconductor, but obviously the invention is not limited thereto.

Connections 32-1M and 32-2M from the discriminators to microprocessor 52 provides for logical detection.

Figure 4:
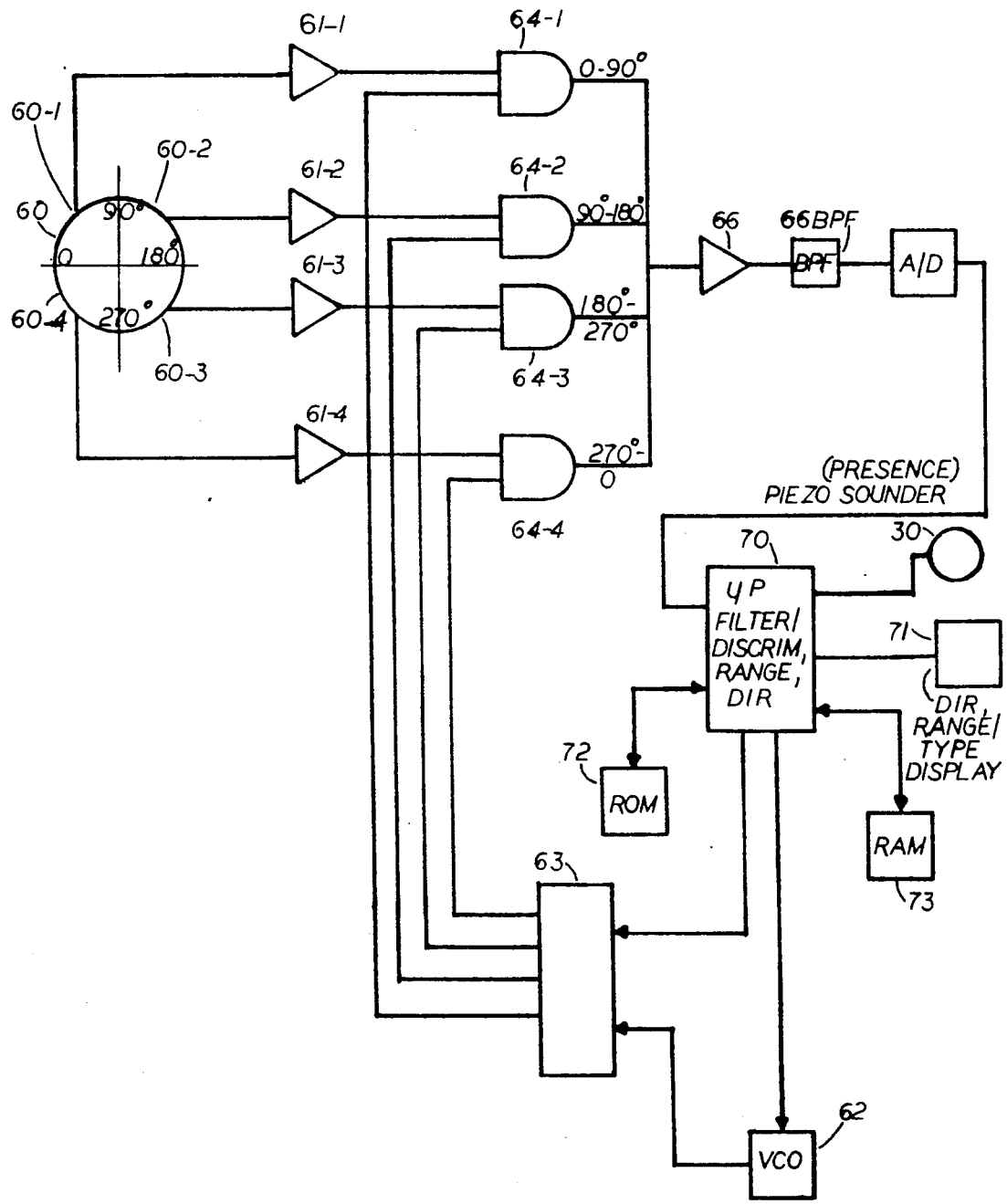
FIG. 4 is a schematic block diagram of a further embodiment of the invention.

Referring now to the embodiment shown in FIG. 4, the transducer 60 has four segments 60-1, 60-2, 60-3 and 60-4 covering the 0 to 90 degree segment quadrant, 90 to 180 degree quadrant, 180 to 270 quadrant, and 270 to 0 degree quadrant. The signals from each of the quadrants are amplified in preamplifiers 61-1, 61-2, 61-3 and 61-4. While the multiplexing operation can be performed either at the transducer head or in the electronic's compartment, in this embodiment, the multiplexing operation is performed at the transducer head. So in this case, the gates 64-1, 64-2, 64-3 and 64-4 are located in the transducer head and receive gate signals from counter 63 via line 64. The gated analog signals constituting the 0 to 90 degree, 90 to 180 degree, 180 to 270 degree ad 270 to 0 degree segments are coupled by a coaxial cable 65 to an amplifier 66, bandpass filter 66BPF and analog-to-digital converter 67. The digital signals constituting the multiplexed output for the individual segments are then supplied to the microprocessor 70 which controls oscillator 62 and, in turn, the counter 63 in a manner similar to the control performed by microprocessor 52 in connection with the embodiment shown in FIG. 3.

In this case, the microprocessor 70 performs the filter and discriminator functions discussed earlier herein and also operates the piezo-sounder 30 and the display 71.

In addition, a read-only memory 72 is provided for storing sonic profiles of large number of fish species which is used to compare with the incoming acoustic or sonic profiles so as to identify a specific fish species. At the same time, microprocessor 70 stores for short term use data in a random access memory 73 for making range calculations to be described later. It is, of course, obvious, that the amplitudes of the sound are also used in this case to determine range. However, as will be described hereafter, range determinations may also be computed from times of arrival of acoustic energy from a given target aquatic animal.

While in the preferred embodiment of the invention, a scanning action is performed, it will be appreciated that a separate channel can be provided for each transducer sector and the outputs of each discriminator 32 sampled or multiplexed to a common display which indicates the sector direction, range, depth and species of aquatic animal in the sector.

Figure 5A:
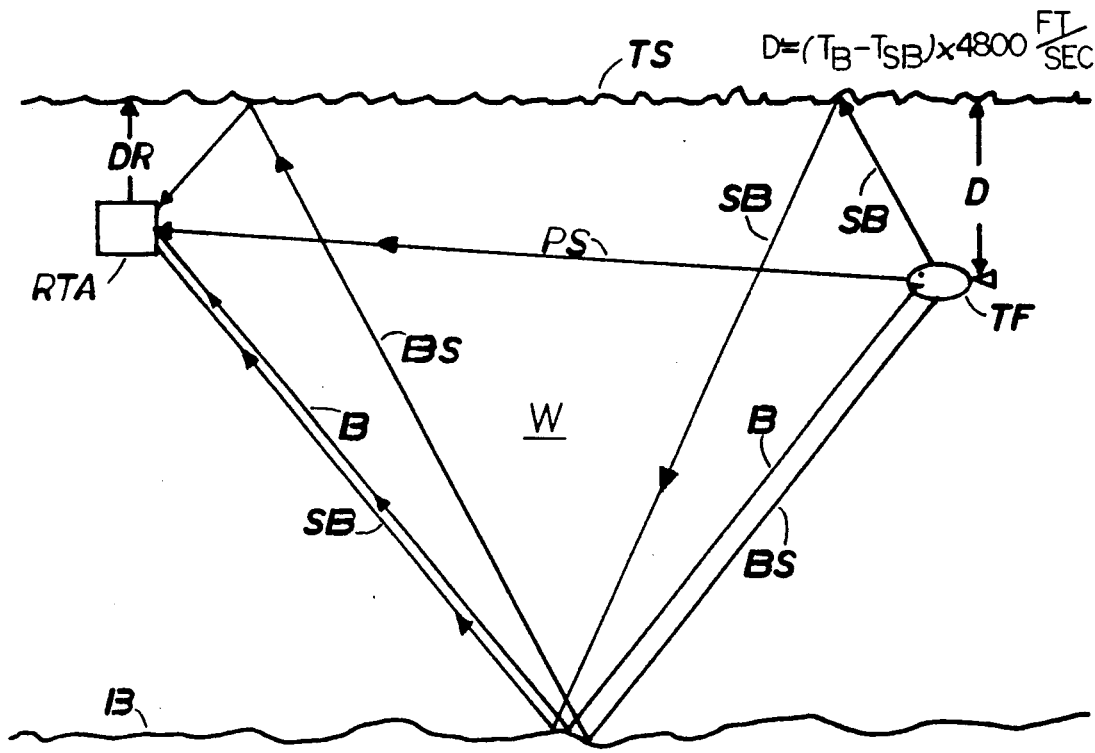
FIG. 5a is a diagram illustrating the acoustic sound path relationships of sound emanating from a target fish to a receiver.
Figure 5B:
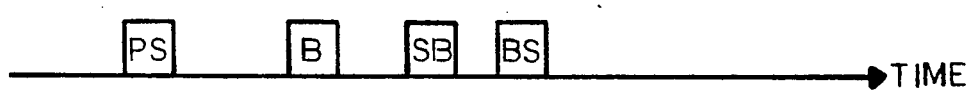
FIG. 5b is a time chart illustrating the relative times of reception of the sonic signal from the fish.

Referring now to FIG. 5, a target fish TF is illustrated in a body of water W having a bottom B which may be quite irregular and a top surfaces TS which may be irregular or smooth depending on surface conditions. The target fish or living source of biosound waves is at a variable distance R and variable depth below the surface relative to the receiver transducer assembly RTA. The direct path of biosound wave signals is indicated as PS and will produce the largest amplitude signal and will arrive at the receiver transducer assembly RTA first. The next signal is the bottom path signal for the path of the bio-soundwave and it traverses a path from the target fish is reflected off the bottom to the receiver transducer assembly RTA and this path is labeled B. The surface bottom path of a biosound wave which traverses from the target fish TF to the surface of the water TS down to the bottom B and thence to a receiver transducer assembly RTA is labeled SB as the surface bottom signal. The bottom to surface signal labeled BS in FIG. 5, traverses a path from the target fish TF to the bottom B is reflected off of the bottom towards the surface TS reflected off the surface TS to the receiver R. There is also of course, the signal emitted by the target fish TF and reflected directly from the water surface TS and received by the receiver transducer assembly RTA. If the target fish and the receiver are at about the same depth in the water, then this signal is almost the same as the direct path signal when the fish is near the surface.

In the time chart shown in FIG. 6, the biosound wave signal labeled PS is the direct path biosound signal, the signal labeled B is the bottom path soundwave signal showing that it arrives at the receiver transducer assembly RTA at a time later than the direct path signal PS. The next group of biosound wave signals are labeled SB and it arrives at a later time than the bottom signal B than does the direct path signal PS. Further, the biosound wave signal labeled BS is at bottom surface signal which traverse the path from the target fish TF to the surface and then is reflected from the surface to the receiver.

It is known that the speed of sound in water at a temperature of 15 degrees C. generally is about 4800 feet per second. This does not take into account the variations in speed due to temperature variations, salinity variations and different stratas, different kinds of sea water and variations going from one temperature stratum to another. It is generally accurate for purposes of this invention.

To determine the range from the receiver transducer assembly RTA to the target fish, the time difference of arrival of the bottom signal B and the bottom surface signal BS (B−BS) times 4800 equals the range in feet.

The depth of the target fish in the water can be determined by the time difference of the bottom signal B minus the surface bottom signal SB (B−SB) times 4800 feet per second.

It will be apparent that the invention can be practiced without doing the range computation discussed above.

These computations provide measures of distance to the fish and may be compared with the amplitude signals to validate or corroborate one another. It is apparent that because the bottom of the body of water may be irregular and have valleys and depressions therein that this could affect the time of arrival of the biosound signals at the receiver R. However, since the range determination is made by the difference in the bottom signal B minus the bottom surface signal BS, this factor is effectively eliminated.

These computations can be easily performed by the microprocessor 20 so that the microprocessor can provide on the display 71 the range to the target, the direction and target type. The piezo-sounder 30 provides an aural or acoustic signal to the user that there is aquatic animals present. In the case of the embodiment of FIGS. 1 and 2, the mechanical orientation of the transducer and the range display 31 provide directional information to the user of the angular direction to the target fish. In the embodiments of FIGS. 3 and 4, which involve electronic scanning about a given axis of a plurality of transducers, the display of angular orientation or direction to the target fish is provided by a display 55, 56 and 71. The actual range for detection has not been determined but is believed to be several miles with the present embodiment.

It will be understood that the above description of the present invention is capable of various modifications and adaptations and changes and that the same are intended to be encompassed within the meaning and spirit and range of equivalence of the appended claims.

What is claimed is:

1. Aquatic animal finder apparatus comprising:
   1) passive transducer means for converting sounds, including bio-soundwaves from a living source traveling in a body of water, to electrical signals, said body of water having a top surface and a bottom surface,
   2) means for causing said transducer to scan about a selected axis,
   3) filter means connected to receive said electrical signals from said transducer means and eliminate from said electrical signals all man-made signals of a periodic character and pass bio-sound electrical signals,
   4) discriminator means connected to said filter means, said discriminator being programmed to pass a predetermined pattern of bio-soundwave electrical signals constituting a sonic profile of a selected aquatic animal,
   5) means for determining the direction of a selected aquatic animal.

2. Aquatic animal finder apparatus as defined in claim 1 including range means for determining the range to said selected aquatic animal.

3. The aquatic animal finder apparatus defined in claim 2 wherein said range means including means for detecting the difference in time of arrival of 1) bio-sound from said living source first reflected off of said bottom surface to said transducer means (B signal), and 2) bio-sound from said living source which has been first reflected from said bottom surface of said body of water and the top surface of said body of water to said transducer means (BS signal).

4. The aquatic animal finder apparatus defined in claim 2 wherein said range means includes a multiple bar display having a number of bars in linear row of bars and display driver means for connection to said discriminator for causing the number of, said bars to illuminate according to the amplitude of biosound signals.

5. The aquatic animal finder apparatus as defined in claim 4 wherein said passive transducer has an aiming axis and the bars of said multiple bar display and said linear row are aligned with said aiming axis so that the number of said bars which are illuminated and the angular orientation of said multiple bar display indicate direction and range to said aquatic animal.

6. Aquatic animal finder apparatus as defined in claim 1 including depth finder means for determining the depth of said selected fish including means for detecting the difference in time of arrival at said transducer of said B signal and (3) bio-sound from said living source which has been reflected from said top surface of said body of water to said bottom surface and to said transducer means (SB signal).

7. Aquatic animal finder apparatus as defined in claim 1 wherein said passive transducer means includes means for positioning said transducer a predetermined distance below the surface of said body of water.

8. Aquatic animal finder apparatus as defined in claim 1 wherein said transducer means includes a plurality of active transducer segments disposed in a predetermined angular pattern about a central selected axis, and said means for causing said transducer to scan about a selected axis includes means for electronically sampling the electrical signals from said plurality of active transducers in a predetermined sequence.

9. Aquatic animal finder apparatus as defined in claim 8 wherein said predetermined angular pattern includes each of the following quadrants, 0–90 degrees, 90–180 degrees, 180–270 degrees and 270–360 degrees, relative to a central substantially vertical axis.

10. Aquatic animal finder apparatus as defined in claim 8 wherein said predetermined angular pattern includes 0–45 degrees, 45–90 degrees, 90–135 degrees, 135–180 degrees, 180–225 degrees, 225–270 degrees, 270–315 degrees, 315–0 degrees about said central vertical axis.

11. Aquatic animal finder apparatus as defined in claim wherein said predetermined sequence is sequential in said quadrants.

12. Aquatic animal finder apparatus as defined in claim 8 including means connected to said discrimination means for terminating said electronic scan at the transducers of said plurality of transducers receiving the largest amplitude of biosound signals and means for indicating the angular relationship of said transducers of said plurality of transducers receiving the largest biosound signals to said selected axis.

13. Aquatic animal finder apparatus as defined in claim 1 including a plurality of said discriminators, each discriminator being programmed for a particular species of fish, respectively, and an indicator means rendered active for each species of fish detected, respectively.

14. Aquatic animal finder apparatus as defined in claim 8 wherein said means for electronically sampling includes a microprocessor connected to receive said biosound signals and detect the maximum amplitude of a plurality of biosound signals.

15. A method of finding aquatic animals comprising:
   at a listening point, converting bio-soundwaves from a living source traveling in a body of water to electrical signals, said body of water having a top surface and a bottom surface,
   filtering said electrical signals to eliminate from said electrical signals all man-made signals of a periodic character and pass bio-sound electrical signals,
   discriminating bio-sound signals after said filtering to pass a predetermined pattern of bio-soundwave electrical signals constituting a sonic profile of a selected fish sound,
   determining the direction of predetermined pattern of bio-soundwaves relative to said listening point, and
   determining the range to said selected fish sound, including detecting the difference in times of arrival of 1) bio-sound from said living source first reflected off of said bottom surface to said listening point (B signal), and 2) bio-sound from said living source which has been first reflected from said bottom surface of said body of water and the top surface of said body of water to said listening point (BS signal).

16. The method as defined in claim 15 including determining the depth of said living source by detecting the difference in time of arrival of 1) bio-sound from said living source first reflected off of said bottom surfaces to said listening point (B signal), and 2) bio-sound from said living source reflected off said surface and then said bottom surface to said listening point (SB signal).

17. Aquatic animal finder apparatus comprising:
1) passive transducer means for converting sounds, including bio-soundwaves from a living aquatic animal source, traveling in a body of water, to electrical signals, said body of water having a top surface and a bottom surface,
2) means for causing said transducer means to scan a 360 degree circle about said passive transducer,
3) filter means connected to receive said electrical signals from said transducer means and eliminate from said electrical signals all man-made signals of a periodic character and pass bio-sound electrical signals,
4) discriminator means connected to said filter means, said discriminator being programmed to pass a predetermined pattern of bio-soundwave electrical signals constituting a sonic profile of a selected aquatic animal sound,
5) means for determining the direction of a selected aquatic animal sound, and
6) range means for determining and indicating the range to said selected aquatic animal solely from said selected aquatic animal sound.

18. Aquatic animal finder apparatus comprising:
1) passive transducer means for converting sounds, including bio-soundwaves from a living aquatic animal source traveling in a body of water, to electrical signals, said body of water having a top surface and a bottom surface,
2) means for causing said transducer to scan about a selected axis,
3) direction means for determining and indicating the direction of a selected aquatic animal, and
4) range means for determining and indicating the range to said aquatic animal solely from said electrical signals.

19. Aquatic animal finder apparatus comprising:
1) passive transducer means for converting sounds, including bio-soundwaves from a living aquatic animal source, traveling in a body of water, to electrical signals, said body of water having a top surface and a bottom surface,
2) means for causing said transducer means to scan a 360 degree circle about said passive transducer, and
3) range means for determining and indicating the range to a selected aquatic animal solely from said electrical signals.

20. Aquatic animal finder apparatus comprising:
1) passive transducer means for converting sounds, including bio-soundwaves from a living aquatic animal source, traveling in a body of water, to electrical signals, said body of water having a top surface and a bottom surface,
2) means for causing said transducer means to scan a 360 degree circle about said passive transducer,
3) means for determining and indicating the direction of a selected aquatic animal sound,
4) range means for determining and indicating the range to said selected aquatic animal solely from said electrical signal, and
5) depth means for determining and indicating the depth of said selected aquatic animal solely from said electrical signals.

21. Aquatic animal finder apparatus as defined in claim 20 wherein each of said idscriminator has a phase lock loop and means for adjusting the set frequency of each said phase lock loop.

22. The aquatic animal finder defined in claim 18 wherein said range means includes means for detecting the difference in time of arrival of bio-sound from said aquatic animal first reflected off of said bottom surface to said transducer means (B signal), and 2) bio-sound from said aquatic animal which has been first reflected from said bottom surface of said body of water and the top surface of said body of water to said transducer means (BS signal).

23. The aquatic animal finder apparatus defined in claim 18 wherein said range means includes a multiple bar display having a number of bars in a linear row and display driver means for connection to said discriminator for causing the number of said bars to illuminate according to the amplitude of bio-sound signals.

24. The aquatic animal finder apparatus as defined in claim 18 wherein said passive transducer has an aiming axis and the bars of said multiple bar display having a number of bars and said linear row are aligned with said aiming axis so that the number of said bars which are illuminated and the angular orientation of said multiple bar display indicate direction and range to said aquatic animal.

25. Aquatic animal finder apparatus as defined in claim 18 including depth finder means for determining the depth of said selected fish including means for detecting the difference in time of arrival at said transducer of said B signal and (3) bio-sound from said living source which has been reflected from said top surface of said body of water to said bottom surface and to said transducer means (SB signal).

26. Aquatic animal finder apparatus as defined in claim 18 wherein said passive transducer means includes means for positioning said transducer a predetermined distance below the surface of said body of water.

27. Aquatic animal finder apparatus as defined in claim 18 wherein said transducer means includes a plurality of active transducer segments disposed in a predetermined angular pattern about a central selected axis, and said means for causing said transducer to scan about a selected axis includes means for electronically sampling the electrical signals from said plurality of active transducers in a predetermined sequence.

28. Aquatic animal finder apparatus as defined in claim 27 including means for terminating said electronic scan at the ones of said plurality of transducers receiving the largest amplitude of bio-sound signals and means for indicating the angular relationship of said one of said plurality of transducers to said selected axis.

29. Aquatic animal finder apparatus as defined in claim 18 including a plurality of discriminators connected to receive said electrical signals, each discriminator being programmed for a particular species of fish, respectively, and an indicator means rendered active for each species of fish detected, respectively.

30. Aquatic animal finder apparatus as defined in claim 18 wherein said means for electronically sampling includes a microprocessor connected to receive said bio-sound signals and detect the maximum amplitude of a plurality of bio-sound signals.

31. The aquatic animal finder apparatus as defined in claim 19 including 4) means for determining the direction of movement of said living aquatic animal solely from said bio-soundwaves.

32. The aquatic animal finder apparatus defined in claim 19 including means for determining the direction of movement of said living aquatic animal solely from said bio-soundwaves and tracking movement of said living aquatic animal after finding of same.

33. The aquatic animal finder defined in claim 17 wherein said discriminator includes a phase lock loop.

34. The aquatic animal finder defined in claim 33 including means for adjusting said phase lock loop.

* * * * *